US011668827B2

(12) United States Patent
Jian

(10) Patent No.: US 11,668,827 B2
(45) Date of Patent: Jun. 6, 2023

(54) UNMANNED AERIAL VEHICLE RANGING METHOD, APPARATUS AND UNMANNED AERIAL VEHICLE

(71) Applicant: AUTEL ROBOTICS CO., LTD., Guangdong (CN)

(72) Inventor: Yupeng Jian, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 603 days.

(21) Appl. No.: 16/798,081

(22) Filed: Feb. 21, 2020

(65) Prior Publication Data
US 2020/0191964 A1 Jun. 18, 2020

Related U.S. Application Data

(63) Continuation of application No. PCT/CN2018/085381, filed on May 2, 2018.

(30) Foreign Application Priority Data

Aug. 22, 2017 (CN) .......................... 201710726019.8

(51) Int. Cl.
*G01C 3/08* (2006.01)
*G01S 17/36* (2006.01)
(Continued)

(52) U.S. Cl.
CPC ............ *G01S 17/36* (2013.01); *G01S 17/933* (2013.01); *G05D 1/0808* (2013.01)

(58) Field of Classification Search
CPC ...... G01S 17/36; G01S 17/933; G05D 1/0808
See application file for complete search history.

(56) References Cited

U.S. PATENT DOCUMENTS 4,413,904 A * 11/1983 Hamada .................. G01S 17/36
356/5.11
10,036,801 B2 * 7/2018 Retterath ................ G01S 17/10

FOREIGN PATENT DOCUMENTS

CN 1643397 A 7/2005
CN 101263402 A 9/2008
(Continued)

OTHER PUBLICATIONS

First Chinese Office Action dated Dec. 11, 2019; Appln. No. 201710726019.8.
(Continued)

*Primary Examiner* — Mark Hellner

(57) ABSTRACT

Implementations of the present invention disclose an unmanned aerial vehicle ranging method, apparatus and an unmanned aerial vehicle. The method includes: controlling, by the unmanned aerial vehicle, to transmit, to a ground, a first modulated light whose frequency is a first modulation frequency, acquiring a first phase deviation between a received first modulated light and the transmitted first modulated light, and calculating a first to-ground distance of the unmanned aerial vehicle according to the first phase deviation and the first modulation frequency; controlling to transmit, to the ground, a second modulated light whose frequency is a second modulation frequency, acquiring a second phase deviation between a received second modulated light and the transmitted second modulated light and a second modulated frequency, and calculating a second to-ground distance of the unmanned aerial vehicle according to the second phase deviation; and calculating a final to-ground distance of the unmanned aerial vehicle according to the first to-ground distance and the second to-ground distance.

14 Claims, 4 Drawing Sheets

(51) Int. Cl.
    *G01S 17/933*     (2020.01)
    *G05D 1/08*     (2006.01)

(56) References Cited

FOREIGN PATENT DOCUMENTS

| CN | 101865997 | A |   | 10/2010 |   |           |
|----|-----------|---|---|---------|---|-----------|
| CN | 104181543 | A |   | 12/2014 |   |           |
| CN | 104635207 | A |   | 5/2015  |   |           |
| CN | 105785385 | A |   | 7/2016  |   |           |
| CN | 106772313 | A |   | 5/2017  |   |           |
| CN | 106772414 | A | * | 5/2017  | … | G01S 17/36 |
| CN | 10989126  | A | * | 6/2019  | … | G01S 17/34 |
| DE | 102017203091 | A | * | 2/2017 | … | G01S 17/36 |

OTHER PUBLICATIONS

International Search Report dated Aug. 9, 2018; PCT/CN2018/085381.

\* cited by examiner

UNMANNED AERIAL VEHICLE RANGING METHOD, APPARATUS AND UNMANNED AERIAL VEHICLE

This application is a continuation application of International Application No. PCT/CN2018/085381, filed on May 2, 2018, which claims priority of Chinese Patent Application No. 201710726019.8, filed on Aug. 22, 2017, which is incorporated herein by reference in its entirety.

BACKGROUND

Technical Field

Implementations of the present invention relate to the technical field of unmanned aerial vehicles, and in particular, to an unmanned aerial vehicle ranging method, apparatus and an unmanned aerial vehicle.

Related Art

During application of an unmanned aerial vehicle, a TOF technology is adopted to acquire distance information. TOF is an acronym of time of flight technologies. A sensor transmits a modulated near infrared light or laser that is reflected after arriving at an object, so that a time difference or a phase difference between light transmission and light reflection is calculated to convert a distance from a photographed scenery, so as to produce depth distance information. However, in the existing TOF technology, when ranging is performed at a high frame rate, data stability needs to be ensured.

In a solution of resolving TOF ranging in the prior art, filtering processing of data is enhanced. In a specific filtering method, current data is calculated and corrected based on historical data, and a current value and a historical value need to be recorded. A simple example is given for illustration:

value=0.3*current_value+0.7*(old_value1+old_value2+)/2;

the value being a filtering result, the current_value representing a current measurement value, the old_value1 representing a last calculated value, and the old_value2 representing a calculated value acquired the time before last time.

In other words, a currently measured calculated value=a currently measured value*0.3+historical value*0.7.

In this way, there is a defect that if a measured value is deviated, correction needs to be performed for many times, that is, correction requires measurement for many times, which shows that fluctuation of delayed data is suppressed in ranging accuracy, by adding an enhanced filter, fluctuation of data may be in 1 to 2 cm, but a very large delay is caused.

Because TOF is periodic, when ranging exceeds a range of the unmanned aerial vehicle and then measurement of a next period is started again, and the sensor itself cannot distinguish such a plurality of periods. The unmanned aerial vehicle still receives valid distance value information after flying beyond the range of TOF, attitude adjustment of the unmanned aerial vehicle is interfered with, and a risk of "bomb"(aircraft fall) may be caused seriously, also called an "outlier" problem. The outlier refers to a distance value that is still detected beyond the range and that is within a reasonable range. The outlier randomly appears, and may appear alone or may appear continuously, and continuous appearance is caused by the plurality of periods.

In a ranging process of the unmanned aerial vehicle, when a distance reaches a full range, a reflected signal itself is very weak, causing great fluctuation. Our time of flight is used to detect a phase with periodicity, and a next period may be entered when a full range is approached. For example, a range of the phase is from 0 to 3000 LSB, and if 3001 is detected, it is treated as 1, jumping may be performed directly from 30 m to 1 cm. Therefore, the unmanned aerial vehicle has an outlier at a critical position of a valid ranging range during ranging. For example, when a critical value of the valid ranging range is 30 m, and when 30 m is measured, there may be an outlier within 25 m-30 m.

Therefore, a fixed frequency is adopted to measure a to-ground distance during ranging by the unmanned aerial vehicle in the prior art, an outlier appears in the valid range of the frequency, and data of the outlier is unstable, causing inaccurate ranging. In the flight process of the unmanned aerial vehicle, inaccurate ranging affects flight judgment of the unmanned aerial vehicle, bringing a risk to stable flight of the unmanned aerial vehicle.

SUMMARY

In order to mainly resolve the technical problems, implementations of the present invention provide an unmanned aerial vehicle ranging method, apparatus and an unmanned aerial vehicle, so as to resolve a problem that a fixed frequency is adopted to measure a to-ground distance during ranging by an unmanned aerial vehicle in the prior art, there being an outlier in the valid range of the frequency, and data of the outlier being unstable.

In order to resolve the foregoing technical problem, a technical solution adopted in the implementations of the present invention is: providing an unmanned aerial vehicle ranging method applied to an unmanned aerial vehicle provided with a light ray transmitting module and a light ray receiving module, where the method includes:

controlling the light ray transmitting module to transmit, to a ground, a first modulated light whose frequency is a first modulation frequency, acquiring a first phase deviation between a first modulated light received by the light ray receiving nodule and the first modulated light transmitted by the light ray transmitting module, and calculating a first to-around distance of the unmanned aerial vehicle according to the first phase deviation and the first modulation frequency;

controlling the light ray receiving module to transmit, to the ground, a second modulated light whose frequency is a second modulation frequency, acquiring a second phase deviation between a second modulated light received by the light ray receiving module and the second modulated light transmitted by the light ray transmitting module, and calculating a second to-ground distance of the unmanned aerial vehicle according to the second phase deviation and the second modulation frequency; and calculating a final to-ground distance of the unmanned aerial vehicle according to the first to-ground distance and the second to-ground distance.

Optionally, the method further includes:

pre-acquiring a plurality of modulated lights corresponding to a plurality of modulation frequencies that are changed in gradient, and calculating and storing a measurement range of the modulated lights corresponding to the plurality of modulation frequencies.

Optionally, the controlling the light ray transmitting module to transmit, to a around, a first modulated light whose frequency is a first modulation frequency includes:

acquiring an initial to-ground distance stored in the unmanned aerial vehicle, querying a pre-stored initial measurement range according to the initial to-ground distance, and acquiring an initial modulation frequency corresponding to the initial to-ground distance according to the initial measurement range; and acquiring a modulation frequency lower than an initial modulation frequency as the first modulation frequency, and controlling the light ray transmitting module to transmit, to the ground, the first modulated light whose frequency is the first modulation frequency.

Optionally, the controlling the light ray receiving module to transmit, to the ground, a second modulated light whose frequency is a second modulation frequency includes:

acquiring a modulation frequency higher than the initial modulation frequency as the second modulation frequency, and controlling the light ray transmitting module to transmit, to the ground, the second modulated light whose frequency is the second modulation frequency.

Optionally, the calculating a final to-ground distance of the unmanned aerial vehicle according to the first to-ground distance and the second to-ground distance includes:

after the first to-ground distance is acquired, dividing the first to-ground distance into an integer place and a decimal place, and acquiring an integer portion of the first to-ground distance as an integer portion of the final to-ground distance of the unmanned aerial vehicle;

after the second to-ground distance is acquired, dividing the second to-ground distance into an integer place and a decimal place, and acquiring a decimal portion of the second to-ground distance as a decimal portion of the final to-ground distance of the unmanned aerial vehicle; and generating the final to-ground distance of the unmanned aerial vehicle according to the integer portion of the final to-ground distance and the decimal portion of the final to-ground distance.

Optionally, the method further includes:

controlling the light ray receiving module to transmit, to the ground, a third modulated light whose frequency is a third modulation frequency, acquiring a third phase deviation between a third modulated light received by the light ray receiving module and the third modulated light transmitted by the light ray transmitting module, and calculating a third to-ground distance of the unmanned aerial vehicle according to the third phase deviation and the third modulation frequency; and calculating a final to-ground distance of the unmanned aerial vehicle according to the first to-ground distance, the second to-ground distance and the third to-ground distance.

Optionally, when it is detected that the first modulation frequency is less than the second modulation frequency, and the second modulation frequency is less than the third modulation frequency, the calculating a final to-ground distance of the unmanned aerial vehicle according to the first to-ground distance, the second to-ground distance and the third to-ground distance includes:

pre-dividing values of the first to-ground distance, the second to-ground distance and the third to-ground distance into an integer place, a tenths digit and a percentile for representation;

after the first to-ground distance is acquired, acquiring an integer portion of the first to-ground distance as an integer portion of the final to-ground distance of the unmanned aerial vehicle;

after the second to-ground distance is acquired, acquiring a tenths digit portion of the second to-ground distance as a tenths digit portion of the final to-ground distance of the unmanned aerial vehicle;

after the third to-ground distance is acquired, acquiring a percentile portion of the third to-ground distance as a percentile portion of the final to-ground distance of the unmanned aerial vehicle; and generating the final to-ground distance of the unmanned aerial vehicle according to the integer portion of the final to-ground distance, the tenths digit portion of the final to-ground distance and the percentile portion of the final to-ground distance.

In order to resolve the foregoing technical problem, another technical solution adopted in the present invention is: providing an unmanned aerial vehicle ranging apparatus applied to an unmanned aerial vehicle provided with a light ray transmitting module and a light ray receiving module, where the apparatus includes:

a first control and calculating module configured to: control the light ray transmitting module to transmit, to a ground, a first modulated light whose frequency is a first modulation frequency, acquire a first phase deviation between a first modulated light received by the light ray receiving module and the first modulated light transmitted by the light ray transmitting module, and calculate a first to-ground distance of the unmanned aerial vehicle according to the first phase deviation and the first modulation frequency;

a second control and calculating module configured to: control the light ray receiving module to transmit, to the ground, a second modulated light whose frequency is a second modulation frequency, acquire a second phase deviation between a second modulated light received by the light ray receiving module and the second modulated light transmitted by the light ray transmitting module, and calculate a second to-ground distance of the unmanned aerial vehicle according to the second phase deviation and the second modulation frequency; and a first calculating module configured to calculate a final to-ground distance of the unmanned aerial vehicle according to the first to-ground distance and the second to-ground distance.

Optionally, the apparatus further includes:

a storage module configured to: pre-acquire a plurality of modulated lights corresponding to a plurality of modulation frequencies that are changed in gradient, and calculate and store measurement ranges of the modulated lights corresponding to the plurality of modulation frequencies.

Optionally, the first control and calculating module is further configured to:

acquire an initial to-ground distance stored in the unmanned aerial vehicle, query a pre-stored initial measurement range according to the initial to-ground distance, and acquire an initial modulation frequency corresponding to the initial to-ground distance according to the initial measurement range; and acquire a modulation frequency lower than an initial modulation frequency as the first modulation frequency, and control the light ray transmitting module to transmit, to the ground, the first modulated light whose frequency is the first modulation frequency.

Optionally, the second control and calculating module is further configured to: acquire a modulation frequency higher than the initial modulation frequency as the second modulation frequency, and control the light ray transmitting module to transmit, to the ground, the second modulated light whose frequency is the second modulation frequency.

Optionally, the first calculating module is further configured to:

after the first to ground distance is acquired, divide the first to-ground distance into an integer place and a decimal place, and acquire an integer portion of the first to-ground distance as an integer portion of the final to-ground distance of the unmanned aerial vehicle;

after the second to-ground distance is acquired, divide the second to-ground distance into an integer place and a decimal place, and acquire a decimal portion of the second to-ground distance as a decimal portion of the final to-ground distance of the unmanned aerial vehicle; and generate the final to-ground distance of the unmanned aerial vehicle according to the integer portion of the final to-ground distance and the decimal portion of the final to-ground distance.

Optionally, another implementation of the implementations of the present invention is to provide an unmanned aerial vehicle ranging apparatus, where the apparatus includes:

a third control and calculating module configured to: control the light ray receiving module to transmit, to the ground, a third modulated light whose frequency is a third modulation frequency, acquire a third phase deviation between a third modulated light received by the light ray receiving module and the third modulated light transmitted by the light ray transmitting module, and calculate a third to-ground distance of the unmanned aerial vehicle according to the third phase deviation and the third modulation frequency; and a second calculating module configured to calculate a final to-ground distance of the unmanned aerial vehicle according to the first to-ground distance, the second to-ground distance and the third to-ground distance.

Optionally, when it is detected that the first modulation frequency is less than the second modulation frequency, and the second modulation frequency is less than the third modulation frequency, the second calculating module is specifically configured to:

pre-divide values of the first to-ground distance, the second to-ground distance and the third to-ground distance into an integer place, a tenths digit and a percentile for representation;

after the first to-ground distance is acquired, acquire an integer portion of the first to-ground distance as an integer portion of the final to-ground distance of the unmanned aerial vehicle;

after the second to-ground distance is acquired, acquire a tenths digit portion of the second to-ground distance as a tenths digit portion of the final to-ground distance of the unmanned aerial vehicle;

after the third to-ground distance is acquired, acquire a percentile portion of the third to-ground distance as a percentile portion of the final to-ground distance of the unmanned aerial vehicle; and generate the final to-ground distance of the unmanned aerial vehicle according to the integer portion of the final to-ground distance, the tenths digit portion of the final to-ground distance and the percentile portion of the final to-ground distance.

In order to resolve the foregoing technical problem, another technical solution adopted in the present invention is: providing an unmanned aerial vehicle, including at least one processor; and a memory communicably connected to the at least one processor; where the memory stores an instruction that may be executed by the at least one processor, the instruction, when executed by the at least one processor, causing the at least one processor to perform the foregoing unmanned aerial vehicle ranging method.

Another implementation of the present invention provides a non-volatile computer readable storage medium storing a computer executable instruction, the computer executable instruction, when executed by one or more processors, causing the one or inure processors to perform the foregoing unmanned aerial vehicle ranging method.

The implementations of the present invention provide an unmanned aerial vehicle ranging method, apparatus and an unmanned aerial vehicle. Different to-ground distances are obtained through measurement by adopting different modulation frequency, and a final to-ground distance is generated after calculation is performed according to different to-ground distances. Different from the prior art, in the implementations of the present invention, a measurement result may be obtained through measurement by combining different frequencies, thereby avoiding interference of an out-of-range portion, quickly and accurately measuring to-ground data of the unmanned aerial vehicle, and improving stability of measuring to-ground altitude data by the unmanned aerial vehicle.

BRIEF DESCRIPTION OF THE DRAWINGS

In order to more clearly illustrate the technical solutions of the embodiments of the present application, the accompanying drawings that need to be used in the embodiments of the present application will be briefly introduced below. Obviously, the accompanying drawings described below are only some embodiments of the present application. For those of ordinary skill in the art, other accompanying drawings can be obtained based on these accompanying drawings without creative efforts.

DETAILED DESCRIPTION

In order to make the objectives, technical solutions, and advantages of the present invention clearer, the present invention is further described in detail below with reference to the accompanying drawings and embodiments. It should be understood that the specific embodiments described herein are only used to explain the present invention and are not intended to limit the present invention.

In the embodiments of the present invention, a modulation frequency refers to that a transmitted light emits an optical signal of a certain frequency after passing through a modulator, different frequencies corresponding to different ranging distances. Distance resolution refers to a minimum value of a phase change. A typical range of the phase change is from 0 to 3000 LSB, different frequencies corresponding to different distance resolutions. A ranging frame rate refers to times of valid ranging per second altitude fixing of the unmanned aerial vehicle refers to that the unmanned aerial vehicle reliably provides to-ground distance information to a flight control system in real time when another sensor data is invalid, in order to maintain a stable flight attitude of an aircraft, which requires continuous output, high precision and a high frame rate.

During flight of the existing unmanned aerial vehicle, altitude fixing of the unmanned aerial vehicle is implemented generally by GPS or other altitude measurement sensors. However, GPS or other altitude measurement sensors of the unmanned aerial vehicle are still required to reliably ensure the fixed altitude of the unmanned aerial vehicle in real time, thereby maintaining the stable flight attitude of the unmanned aerial vehicle.

Figure 1:
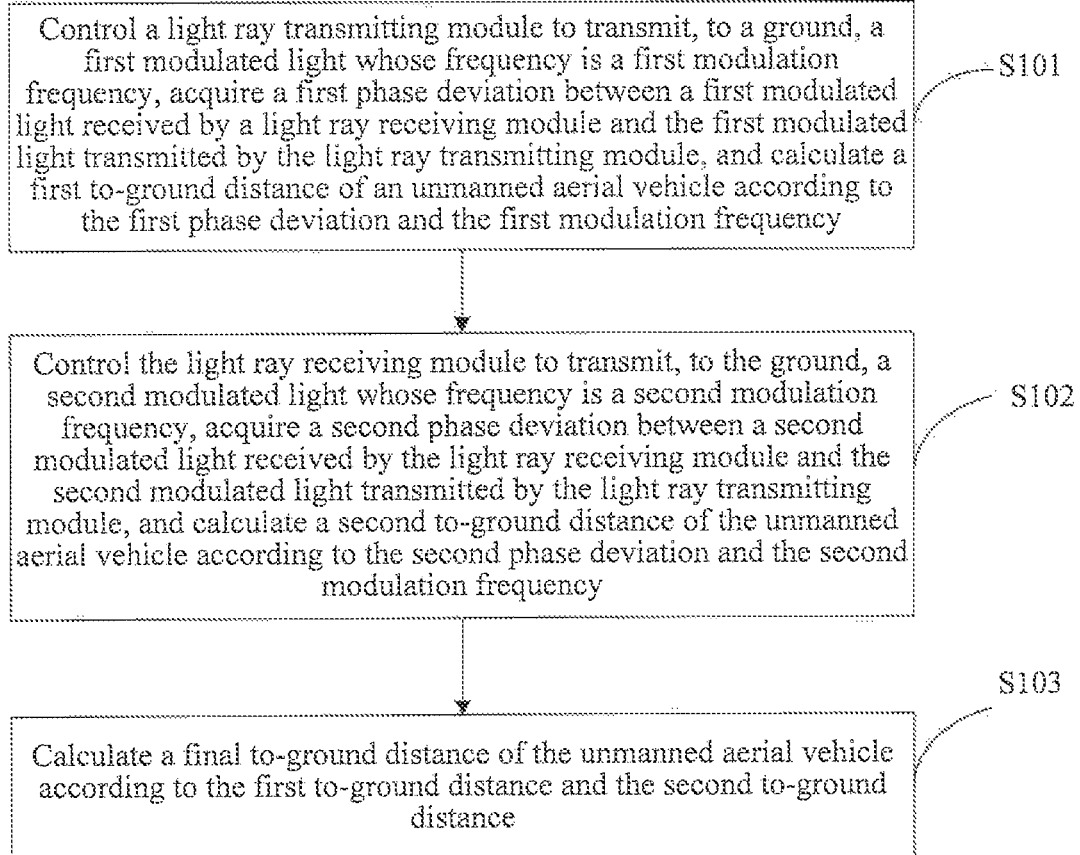
FIG. 1 is a schematic flowchart of an unmanned aerial vehicle ranging method according to an embodiment of the present invention.

Referring to FIG. 1, FIG. 1 is a schematic flowchart of an unmanned aerial vehicle ranging method according to an embodiment of the present invention. In the embodiment of the present invention, the method is applied to an unmanned aerial vehicle provided with a light ray transmitting module for transmitting a light ray and a light ray receiving module for receiving a light ray. The light ray is a modulated near infrared light or laser. The implementation includes the following steps.

Step S101: The light ray transmitting module is controlled to transmit, to a ground, a first modulated light whose frequency is a first modulation frequency, a first phase deviation between a first modulated light received by the light ray receiving module and the first modulated light transmitted by the light ray transmitting module is acquired, and a first to-ground distance of the unmanned aerial vehicle is calculated according to the first phase deviation and the first modulation frequency.

In a practical application, a relative altitude of the unmanned aerial vehicle to the ground is measured using the TOF time of flight technology. Light propagation of TOF is from a transmitting portion to a receiving portion. A light may be modulated into light pulses of different frequencies after passing through a modulator. The light ray transmitting module is an LED or a laser tube. Because the LED or the laser tube has a certain delay, an emitted light is close to a light pulse signal of a sine wave curve, and therefore different propagation distances are calculated according to the phase deviation.

For example, during flight of the unmanned aerial vehicle, the light ray transmitting module is controlled to transmit, to the ground, a first modulated light whose frequency is a first modulation frequency, then, according to a first phase deviation between a first modulated light received by the light ray receiving module and the previous first modulated light, a first to-ground distance of the unmanned aerial vehicle is calculated according to the first phase deviation. That the first to-ground distance is calculated according to the first phase deviation and the first modulation frequency through the TOF time of flight technology is specifically that a first time difference between a time at which the light ray receiving module receives the first modulated light and a time at which the light ray transmitting module transmits the first modulated light is calculated according to the first phase difference and the first modulation frequency. A first modulation period of the first modulated light is calculated according to the first modulation frequency, a phase of one period being 360 degrees. The first time difference is calculated through the first phase deviation divided by 360 and multiplied by the first modulation period of the first modulated light is, and the first to-ground distance is obtained through the first time difference multiplied by a light speed. For example, if the first modulation frequency is 10 MHz, the first modulation period of the first modulated light is $1*10^{-7}$ s. If the first phase deviation is 180 LSB, the first time difference is $180/360*1*10^{-7}=5*10^{-8}$ s, and the first to-ground distance is $3*10^8*5*10^{-8}=15$ m.

Step S102: The light ray receiving module is controlled to transmit, to the ground, a second modulated light whose frequency is a second modulation frequency, a second phase deviation between a second modulated light received by the light ray receiving module and the second modulated light transmitted by the light ray transmitting module is acquired, and a second to-ground distance of the unmanned aerial vehicle is calculated according to the second phase deviation and the second modulation frequency.

In the embodiment of the present invention, the second modulation frequency is a modulated light distinguished from the first modulation frequency. The first modulation frequency may be less than the first modulation frequency or may be greater than the first modulation frequency. Modulated light with different frequencies may be adopted to measure a distance of different ranges. A modulated light with a low modulation frequency has a large ranging range and a low precision, and a modulated light with a high modulation frequency has a small ranging range and a high precision. Therefore, different precisions may be obtained through detection by adopting a frequency different from a frequency in step S101.

In particular, the second to-ground distance is calculated in a way the same as a way in which the first to-ground distance is calculated, details thereof being not described herein again.

Step S103: A final to-ground distance of the unmanned aerial vehicle is calculated according to the first to-ground distance and the second to-ground distance.

During specific implementation, after to-ground distances obtained through measurement by different modulation frequencies are acquired, a to-ground distance corresponding to a smaller modulation frequency between the first to-ground distance and the second to-ground distance is acquired as a reference for the final to-ground distance of the unmanned aerial vehicle, the remaining to-ground distance is used as precision calibration, and the final to-ground distance is generated by combining the first to-ground distance and the second to-ground distance.

Optionally, the method further includes the following steps.

Step S100: A plurality of modulated lights corresponding to a plurality of modulation frequencies that are changed in gradient are pre-acquired, and measurement ranges of the modulated lights corresponding to the plurality of modulation frequencies are calculated and stored.

In a practical application, in order to speed up a measurement speed, measurement ranges of a plurality of modulation frequencies are only pre-acquired and stored. Different propagation distances are calculated through the phase deviation, that is, theoretical distances corresponding to different modulation frequencies that are changed in gradient in Table 1. The theoretical distances are maximum values of valid ranges corresponding to the modulation frequencies, the light speed being $3*10^8$ m/s:

TABLE 1

| Modulation frequency (f) | Theoretical distance (d) | Distance resolution (r) |
| --- | --- | --- |
| 20.00 MHz | 7.5 m | 0.25 cm |
| 10.00 MHz | 15 m | 0.50 cm |
| 5.00 MHz | 30 m | 1.00 cm |
| 2.50 MHz | 60 m | 2.00 cm |
| 1.25 MHz | 120 m | 4.00 cm |

Table 1 is a measurement table of the modulation frequencies and the theoretical distances, a period T=1/f, a unit of the period being s, the theoretical distance d=T/2*3*10$^8$, a unit of the theoretical distance being m, the distance resolution r=d/range, and a typical value of the range being from 0 to 3000 LSB representing a phase range. A range value in Table 1 is 3000 LSB. The distance resolution is data fluctuation generated by a theoretical phase deviated by 1 LSB. It may be known from Table 1 that as the frequency is higher, and the distance is shorter, the distance resolution is smaller. As the frequency is lower, and the distance is longer, the distance resolution is larger.

As an optional implementation, in step S101, when an unmanned aerial vehicle is in a flight state, that the light ray transmitting module is controlled to transmit, to the ground, the first modulated light whose frequency is the first modulation frequency includes:

Step S111: An initial to-ground distance stored in the unmanned aerial vehicle is acquired, a pre-stored initial measurement range is queried according to the initial to-ground distance, and an initial modulation frequency corresponding to the initial to-ground distance is acquired according to the initial measurement range.

Step S112: A modulation frequency lower than the initial modulation frequency is acquired as the first modulation frequency, and the light ray transmitting module is controlled to transmit, to the ground, the first modulated light whose frequency is the first modulation frequency.

In particular, the initial to-ground distance stored in the unmanned aerial vehicle is acquired. For example, during flight of the unmanned aerial vehicle, when ranging sensor data of the unmanned aerial vehicle is detected to be invalid, the initial to-ground distance stored in the unmanned aerial vehicle is acquired, such as 25.34 m, and then an optimal initial modulation frequency is acquired as 5 MHz by querying a correspondence between the pre-stored measurement range and the modulation frequency according to 25.34 m, that is, a correspondence between the theoretical distance and the modulation frequency in Table 1.

It may be known through searching the table that if the modulation frequency lower than the initial modulation frequency is acquired as the first modulation frequency, 2.5 MHz is directly adopted as the first modulation frequency. When the modulation frequency is 5 MHz, and when the to-ground distance is measured, although a range is 30 m, there is an outlier interval in a critical interval of 25 m-30 m. Therefore, 2.5 MHz is adopted as the first modulation frequency to ensure an approximate measurement range.

As an optional implementation, in step 102, that the light receiving module is controlled to transmit, to the ground, the second modulated light whose frequency is the second modulation frequency specifically includes the following steps.

Step S121: A modulation frequency higher than the initial modulation frequency is acquired as the second modulation frequency, and the light ray transmitting module is controlled to transmit, to the ground, the second modulated light whose frequency is the second modulation frequency.

In particular, the modulation frequency higher than the initial modulation frequency is acquired as the second modulation frequency. It may be known through searching the table that 10 MHz is directly adopted as the second modulation frequency. When the first modulation frequency is 2.5 MHz, and when the to-ground distance is measured, although measurement accuracy may be ensured, because the measurement precision of 2.5 MHz is small, a modulation frequency with a high frequency is required to improve the measurement precision. Therefore, 10 MHz is adopted as the second modulation frequency to improve the measurement precision.

As an optional implementation, step S103 includes the following steps.

Step S131: After the first to-ground distance is acquired, the first to-ground distance is divided into an integer place and a decimal place, and an integer portion of the first to-ground distance is acquired as an integer portion of the final to-ground distance of the unmanned aerial vehicle.

Step S132: After the second to-ground distance is acquired, the second to-ground distance is divided into an integer place and a decimal place, and a decimal portion of the second to-ground distance is acquired as a decimal portion of the final to-ground distance of the unmanned aerial vehicle.

Step S133: The final to-ground distance of the unmanned aerial vehicle is generated according to the integer portion of the final to-ground distance and the decimal portion of the final to-ground distance.

In particular, an integer value of the to-ground distance is measured using a modulated light corresponding to a low frequency, that is, an integer value of the first to-ground distance, a decimal value of a to-ground distance is measured using the second modulated light corresponding to a high frequency, that is, a decimal value of the second to-ground distance. The final to-ground distance is obtained by summing the integer value of the first to-ground distance and the decimal value of the second to-ground distance. The to-ground distance is measured by adopting different frequencies, so that a to-ground altitude of the unmanned aerial vehicle may be more accurate.

For example, during a first measurement, a first to-ground distance is obtained through measurement as 25.85 m by adopting a modulation frequency of 2.5 MHz, so that an integer portion may be obtained, and a decimal portion is discarded, thereby obtaining a valid value value1=25.00 m, and during a second measurement, a distance is obtained through measurement as 10.39 m by adopting a modulation frequency of 10 MHz, so that only a decimal portion 0.39 is acquired, thereby obtaining a valid value 2=0.39 m.

A valid ranging value: Results=value1+value2=25+0.34=25.39 m.

Figure 2:
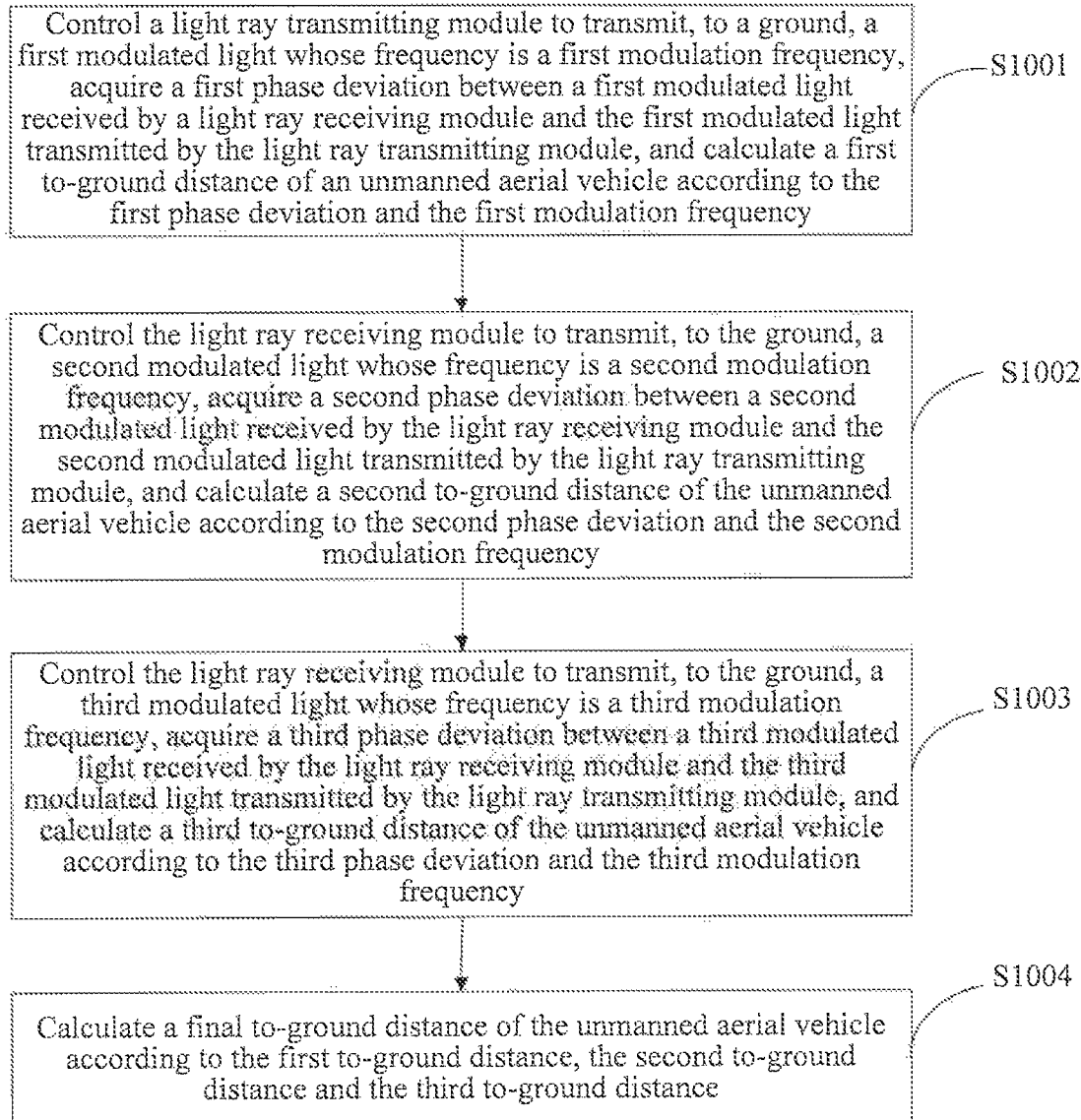
FIG. 2 is a schematic flowchart of an unmanned aerial vehicle ranging method according to another embodiment of the present invention.

Referring to FIG. 2, FIG. 2 is a schematic flowchart of an unmanned aerial vehicle ranging method according to another embodiment of the present invention. In the embodiment of the present invention, the method is applied to an unmanned aerial vehicle provided with a light ray transmitting module for transmitting a light ray and a light ray receiving module for receiving a light ray. The implementation includes the following steps.

Step S1001: The light ray transmitting module is controlled to transmit, to a ground, a first modulated light whose frequency is a first modulation frequency, a first phase deviation between a first modulated light received by the light ray receiving module and the first modulated light transmitted by the light ray transmitting module is acquired, and a first to-ground distance of the unmanned aerial vehicle is calculated according to the first phase deviation and the first modulation frequency.

Step S1002: The light ray receiving module is controlled to transmit, to the ground, a second modulated light whose frequency is a second modulation frequency, a second phase deviation between a second modulated light received by the light ray receiving module and the second modulated light transmitted by the light ray transmitting module is acquired, and a second to-ground distance of the unmanned aerial vehicle is calculated according to the second phase deviation and the second modulation frequency.

Step S1003: The light ray receiving module is controlled to transmit, to the ground, a third modulated light whose frequency is a third modulation frequency, a third phase deviation between a third modulated light received by the light ray receiving module and the third modulated light transmitted by the light ray transmitting module is acquired, and a third to-ground distance of the unmanned aerial vehicle is calculated according to the third phase deviation and the third modulation frequency.

Step S1004: A final to-ground distance of the unmanned aerial vehicle is calculated according to the first to-ground distance, the second to-ground distance and the third to-ground distance.

In this embodiment, a difference from the foregoing embodiment is that a same to-ground distance is obtained by three times of measurement in a measurement manner that is similar to a measurement manner of the foregoing embodiment, and details are not described again. Finally, the final to-ground distance of the unmanned aerial vehicle is generated according to to-ground distances obtained by three times of measurement.

A frequency in a larger grade of range is adopted to identify outlier data of an out-of-range portion, for example, when the range is 30 m, if 5 MHz is selected, then an interference value may still be measured when a practical distance is 32 m. In order to identify these interference values effectively, a larger grade of frequency is adopted for measurement to prevent an interference problem of the out-of-range portion. In this case, 2.5 MHz is selected, and only an integer portion is adopted.

In an optional implementation, when it is detected that the first modulation frequency is less than the second modulation frequency, and the second modulation frequency is less than the third modulation frequency, step S1004 specifically includes the following steps.

Step S1041: Values of the first to-ground distance, the second to-ground distance and the third to-ground distance are pre-divided into an integer place, a tenths digit and a percentile for representation.

Step S1042: After the first to-ground distance is acquired, an integer portion of the first to-ground distance is acquired as the integer portion of the final to-ground distance of the unmanned aerial vehicle.

Step S1043: After the second to-ground distance is acquired, a tenths digit portion of the second to-ground distance is acquired as a tenths digit portion of the final to-ground distance of the unmanned aerial vehicle.

Step S1044: After the third to-ground distance is acquired, a percentile portion of the third to-ground distance is acquired as a percentile portion of the final to-ground distance of the unmanned aerial vehicle.

Step S1045: The final to-ground distance of the unmanned aerial vehicle is generated according to the integer portion of the final to-ground distance, the tenths digit portion of the final to-ground distance and the percentile portion of the final to-ground distance.

During specific implementation, for ease of description, the values are divided into an integer place, a tenths digit and a percentile for representation.

During a first measurement, a distance is obtained through measurement as 25.85 m by adopting a modulation frequency of 2.5 MHz, so that an integer portion may be obtained, and a decimal portion is discarded, thereby obtaining a valid value of value1=25.00 m.

During a second measurement, a distance is obtained through measurement as 10.39 m by adopting a modulation frequency of 10 MHz, so that only a tenths digit 0.3 is adopted, thereby obtaining a valid value of value2=0.30 m.

During a third measurement, a distance is obtained through measurement as 5.34 m by adopting a modulation frequency of 20 MHz, so that only a percentile 0.04 is adopted, thereby obtaining a valid value of value3=0.04 m.

A valid ranging value: Result=value1+value2+value3=25.34 m.

In order to obtain a result of long ranging and small data fluctuation as well as combining advantages of both high and low frequencies, and to overcome a problem of crossing a critical region, when 30 m is measured, only 5 MHz is selected in a traditional method. In fact, when it is close to 30 m (such as an outlier in a range of 25 m-35 m), data is very unstable due to the critical region, and 2.5 MHz is selected to cleverly avoid the problem of the critical region. Because a critical region of 2.5 MHz is about 60 m, and at 60 m, a signal is very weak, so that a valid signal cannot be detected at all, and a zero value is directly returned, indicating out-of-range.

Figure 3:
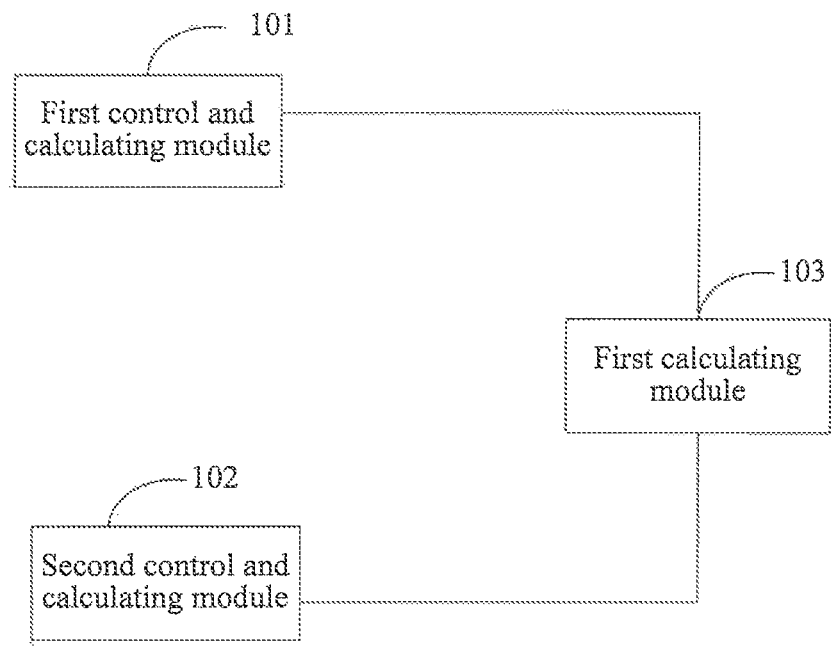
FIG. 3 is a schematic diagram of a functional structure of an unmanned aerial vehicle ranging apparatus according to an embodiment of the present invention.

Referring to FIG. 3, FIG. 3 is a schematic diagram of a functional structure of an unmanned aerial vehicle ranging apparatus according to another embodiment of the present invention. The apparatus is applied to an unmanned aerial vehicle provided with a light ray transmitting module and a light ray receiving module. As shown in FIG. 3, the apparatus includes:

a first control and calculating module 101 configured to: control the light ray transmitting module to transmit, to a ground, a first modulated light whose frequency is a first modulation frequency, acquire a first phase deviation between a first modulated light received by the light ray receiving module and the first modulated light transmitted by the light ray transmitting module, and calculate a first to-ground distance of the unmanned aerial vehicle according to the first phase deviation and the first modulation frequency;

a second control and calculating module 102 configured to: control the light ray receiving module to transmit, to the ground, a second modulated light whose frequency is a second modulation frequency, acquire a second phase deviation between a second modulated light received by the light ray receiving module and the second modulated light transmitted by the light ray transmitting module, and calculate a second to-ground distance of the unmanned aerial vehicle according to the second phase deviation and the second modulation frequency; and a first calculating module 103 configured to calculate a final to-ground distance of the unmanned aerial vehicle according to the first to-ground distance and the second to-ground distance.

In particular, a relative altitude of the unmanned aerial vehicle to the ground is measured using the TOF time of flight technology. Light propagation of TOF is from a transmitting portion to a receiving portion. A light may be modulated into light pulses of different frequencies after passing through a modulator. The light ray transmitting module is an LED or a laser tube. Because the LED or the laser tube has a certain delay, an emitted light is close to a light pulse signal of a sine wave curve, and therefore different propagation distances are calculated according to the phase deviation.

The first control and calculating module 101 is configured to: during flight of the unmanned aerial vehicle, control the light ray transmitting module to transmit, to the ground, a first modulated light whose frequency is a first modulation frequency, and then, according to a first phase deviation between a first modulated light received by the light ray receiving module and the previous first modulated light, calculate a first to-ground distance of the unmanned aerial vehicle according to the first phase deviation. That the first to-ground distance is calculated according to the first phase deviation and the first modulation frequency through the TOF time of flight technology is specifically that a first time difference between a time at which the light ray receiving module receives the first modulated light and a time at which the light ray transmitting module transmits the first modulated light is calculated according to the first phase difference and the first modulation frequency. A first modulation period of the first modulated light is calculated according to the first modulation frequency, a phase of one period being 360 degrees. The first time difference is calculated through the first phase deviation divided by 360 and multiplied by the first modulation period of the first modulated light is, and the first to-ground distance is obtained through the first time difference multiplied by a light speed. For example, if the first modulation frequency is 10 MHz, the first modulation period of the first modulated light is $1*10^{-7}$ s. If the first phase deviation is 180 LSB, the first time difference is $80/360*1*10^{-7}=5*10^{-8}$ s, and the first to-ground distance is $3*10^8*5*10^{-8}=15$ m.

In the second control and calculating module 102, the second modulation frequency is adopted to measure a to-ground distance. The second modulation frequency is a modulated light distinguished from the first modulation frequency. The first modulation frequency may be less than the first modulation frequency or may be greater than the first modulation frequency. Modulated light with different frequencies may be adopted to measure a distance of different ranges. A modulated light with a low modulation frequency has a large ranging range and a low precision, and a modulated light with a high modulation frequency has a small ranging range and a high precision. Therefore, different precisions may be obtained through detection by adopting a different frequency.

In particular, the second to-ground distance is calculated in a way the same as a way in which the first to-ground distance is calculated, details thereof being not described herein again.

The first calculating module 103 is configured to: after acquiring to-ground distances obtained through measurement by different modulation frequencies, acquire a to-around distance corresponding to a smaller modulation frequency between the first to-ground distance and the second to-ground distance as a reference for the final to-ground distance of the unmanned aerial vehicle, use the remaining to-ground distance as precision calibration, and generate the final to-ground distance by combining the first to-ground distance and the second to-ground distance.

As an optional implementation, the apparatus further includes:

a storage module configured to: pre-acquire a plurality of modulated lights corresponding to a plurality of modulation frequencies that are changed in gradient, and calculate and store measurement ranges of the modulated lights corresponding to the plurality of modulation frequencies.

In order to speed up a measurement speed, measurement ranges of a plurality of modulation frequencies are acquired and pre-stored in the storage module. Different propagation distances are calculated through the phase deviation, that is, theoretical distances corresponding to different modulation frequencies that are changed in gradient in Table 1.

As an optional implementation, the first control and calculating module 103 is further configured to:

acquire an initial to-ground distance stored in the unmanned aerial vehicle, query a pre-stored initial measurement range according to the initial to-ground distance, and acquire an initial modulation frequency corresponding to the initial to-ground distance according to the initial measurement range; and acquire a modulation frequency lower than an initial modulation frequency as the first modulation frequency, and control the light ray transmitting module to transmit, to the ground, the first modulated light whose frequency is the first modulation frequency.

During specific implementation, the first control and calculating module 101 is further configured to acquire the initial to-ground distance stored in the unmanned aerial vehicle, For example, during flight of the unmanned aerial vehicle, when ranging sensor data of the unmanned aerial vehicle is detected to be invalid, the initial to-ground distance stored in the unmanned aerial vehicle is acquired, such as 25.34 m, and then an optimal initial modulation frequency is acquired as 5 MHz by querying a correspondence between the pre-stored measurement range and the modulation frequency according to 25.34 m, that is, a correspondence between the theoretical distance and the modulation frequency in Table 1.

It may be known through searching Table 1 that if the modulation frequency lower than the initial modulation frequency is acquired as the first modulation frequency, 2.5 MHz is directly adopted as the first modulation frequency. When the modulation frequency is 5 MHz, and when the to-ground distance is measured, although a range is 30 m, there is an outlier interval in a critical interval of 25 m-30 m. Therefore, 2.5 MHz is adopted as the first modulation frequency to ensure an approximate measurement range.

As an optional implementation, the second control and calculating module 102 is further configured to: acquire a modulation frequency higher than the initial modulation frequency as the second modulation frequency, and control the light ray transmitting module to transmit, to the ground, the second modulated light whose frequency is the second modulation frequency.

In particular, the second control and calculating module 104 is further configured to: acquire the modulation frequency higher than the initial modulation frequency as the second modulation frequency. It may be known through searching the table that 10 MHz is directly adopted as the second modulation frequency. When the first modulation frequency is 2.5 MHz, and when the to-ground distance is measured, although measurement accuracy may be ensured, because the measurement precision of 2.5 MHz is small, a modulation frequency with a high frequency is required to improve the measurement precision. Therefore, 10 MHz is adopted as the second modulation frequency to improve the measurement precision.

As an optional implementation, the first calculating module 103 is further configured to:

after the first to-ground distance is acquired, divide the first to-ground distance into an integer place and a decimal place, and acquire an integer portion of the first to-ground distance as an integer portion of the final to-ground distance of the unmanned aerial vehicle;

after the second to-ground distance is acquired, divide the second to-ground distance into an integer place and a decimal place, and acquire a decimal portion of the second to-ground distance as a decimal portion of the final to-ground distance of the unmanned aerial vehicle; and generate the final to-ground distance of the unmanned aerial vehicle according to the integer portion of the final to-ground distance and the decimal portion of the final to-ground distance.

In particular, the first calculating module 103 is further configured to: obtain an integer value of a to-ground distance through measurement using a modulated light corresponding to a low frequency, that is, an integer value of the first to-ground distance, obtain a decimal value of a to-ground distance through measurement using the second modulated light corresponding to a high frequency, that is, a decimal value of the second to-ground distance. The final to-ground distance is obtained by summing the integer value of the first to-ground distance and the decimal value of the second to-ground distance. The to-ground distance is measured by adopting different frequencies, so that a to-ground altitude of the unmanned aerial vehicle may be more accurate.

For example, during a first measurement, a first to-ground distance is measured as 25.85 m by adopting a modulation frequency of 2.5 MHz, so that an integer portion may be obtained, and a decimal portion is discarded, thereby obtaining a valid value value1=25.00 m, and during a second measurement, a distance is measured as 10.34 m by adopting a modulation frequency of 10 MHz, so that only a decimal portion 0.34 is acquired, thereby obtaining a valid value2=0.39 m.

A valid ranging value: Result=value1+value2=25+0.34=25.39 m.

Figure 4:
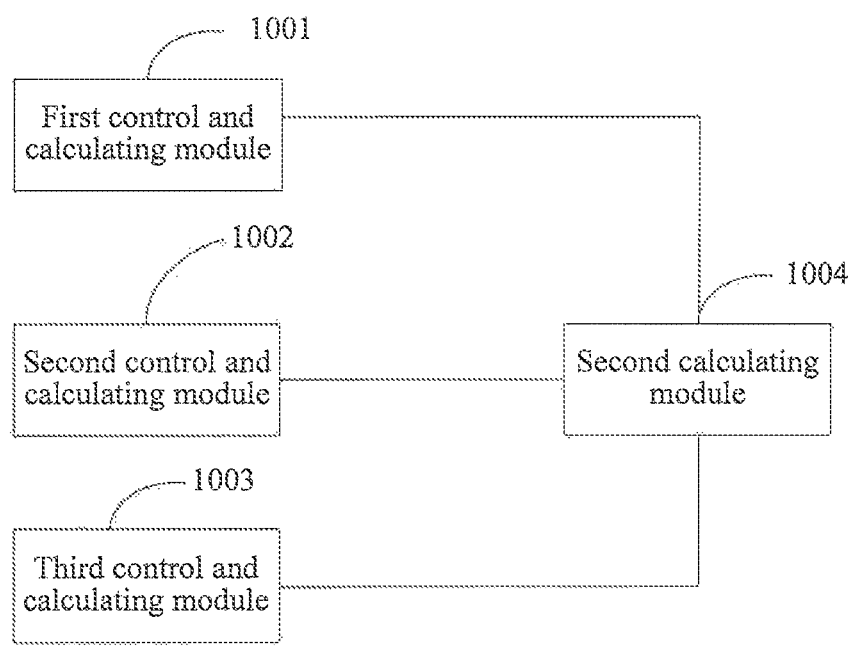
FIG. 4 is a schematic diagram of a functional structure of an unmanned aerial vehicle ranging apparatus according to another embodiment of the present invention.

Referring to FIG. 4, FIG. 4 is an unmanned aerial vehicle ranging apparatus according to another embodiment of the present invention. The apparatus is applied to an unmanned aerial vehicle provided with a light ray transmitting module and a light ray receiving module. As shown in FIG. 4, the apparatus includes:

a first control and calculating module 1001 configured to: control the light ray transmitting module to transmit, to a ground, a first modulated light whose frequency is a first modulation frequency, acquire a first phase deviation between a first modulated light received by the light ray receiving module and the first modulated light transmitted by the light ray transmitting module, and calculate a first to-ground distance of the unmanned aerial vehicle according to the first phase deviation and the first modulation frequency;

a second control and calculating module 1002 configured to: control the light ray receiving module to transmit, to the ground, a second modulated light whose frequency is a second modulation frequency, acquire a second phase deviation between a second modulated light received by the light ray receiving module and the second modulated light transmitted by the light ray transmitting module, and calculate a second to-ground distance of the unmanned aerial vehicle according to the second phase deviation and the second modulation frequency; and a third control and calculating module 1003 configured to: control the light ray receiving module to transmit, to the ground, a third modulated light whose frequency is a third modulation frequency, acquire a third phase deviation between a third modulated light received by the light ray receiving module and the third modulated light transmitted by the light ray transmitting module, and calculate a third to-ground distance of the unmanned aerial vehicle according to the third phase deviation and the third modulation frequency; and a second calculating module 1004 configured to calculate a final to-ground distance of the unmanned aerial vehicle according to the first to-ground distance, the second to-ground distance and the third to-ground distance.

During specific implementation, in this embodiment, a difference from the foregoing embodiment is that a same to-ground distance is obtained by three times of measurement in a measurement manner that is similar to a measurement manner of the foregoing embodiment, and details are not described again. Finally, the final to-ground distance of the unmanned aerial vehicle is generated according to to-ground distances obtained by three times of measurement.

A frequency in a larger grade of range is adopted to identify outlier data of an out-of-range portion, for example, when the range is 30 m, if 5 MHz is selected, then an interference value may still be measured when a practical distance is 32 m. In order to identify these interference values effectively, a larger grade of frequency is adopted for measurement to prevent an interference problem of the out-of-range portion. In this case, 2.5 MHz is selected, and only an integer portion is adopted.

In an optional implementation, when it is detected that the first modulation frequency is less than the second modulation frequency, and the second modulation frequency is less than the third modulation frequency, the second calculating module is specifically configured to:

pre-divide values of the first to-ground distance, the second to-ground distance and the third to-ground distance into an integer place, a tenths digit and a percentile for representation;

after the first to-ground distance is acquired, acquire an integer portion of the first to-ground distance as an integer portion of the final to-ground distance of the unmanned aerial vehicle;

after the second to-ground distance is acquired, acquire a tenths digit portion of the second to-ground distance as a tenths digit portion of the final to-ground distance of the unmanned aerial vehicle;

after the third to-ground distance is acquired, acquire a percentile portion of the third to-ground distance as a percentile portion of the final to-ground distance of the unmanned aerial vehicle; and generate the final to-ground distance of the unmanned aerial vehicle according to the integer portion of the final to-ground distance, the tenths digit portion of the final to-ground distance and the percentile portion of the final to-ground distance.

During specific implementation, for example, for ease of description, in the second calculating module, the value is divided into an integer place, a tenths digit and a percentile for representation.

During a first measurement, a distance is obtained through measurement as 25.85 m by adopting a modulation frequency of 2.5 MHz, so that an integer portion may be obtained, and a decimal portion is discarded, thereby obtaining a valid value of value1=25.00 m.

During a second measurement, a distance is obtained through measurement as 10.39 m by adopting a modulation frequency of 10 MHz, so that only a tenths digit 0.3 is adopted, thereby obtaining a valid value of value2=0.30 m.

During a third measurement, a distance is obtained through measurement as 5.34 m by adopting a modulation frequency of 20 MHz, so that only a percentile 0.04 is adopted, thereby obtaining a valid value of value3=0.04 m.

A valid ranging value: Result=value1+value2+value3=25.34 m.

It may be known from a correspondence table of frequency and distance, a ranging range of a low frequency is large, but a precision (distance resolution) is relatively high, while a ranging range of a high frequency is small, but the precision is very high, and if phase is fluctuated by 2 LSB, precision fluctuation generated at 2.5 MHz: 2*2 cm=4 cm; and precision fluctuation generated at 2.0 MHz: 2*0.25 cm=0.5 cm; and Obviously, high-frequency data fluctuation is much less but a measurement range is only 7.5 m. In order to obtain a final result of a large range and a small fluctuation, this bit division is performed.

The division herein is necessary but it is not necessarily to divide into 3 groups or 2 groups. 3 groups herein are only an example to illustrate a measurement method of combining a high frequency and a low frequency in this specification (the integer place, the tenths digit and the percentile).

Figure 5:
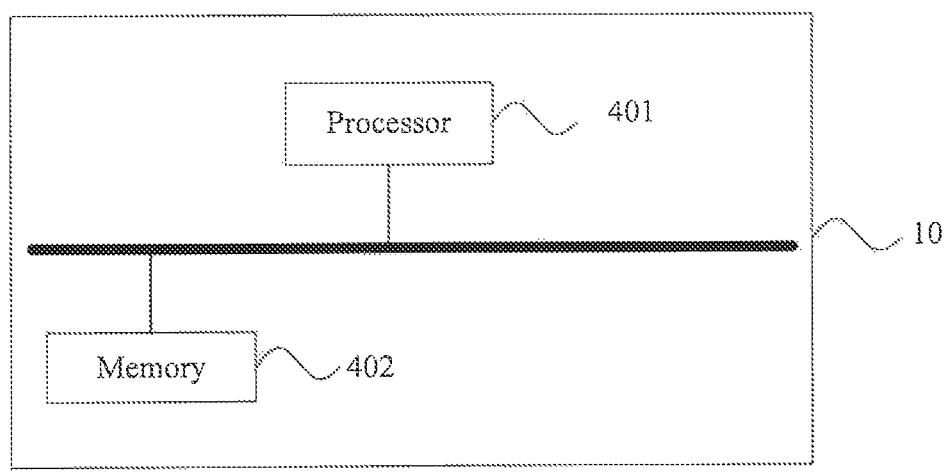
FIG. 5 is a structural diagram of hardware of an unmanned aerial vehicle according to another embodiment of the present invention.

Another embodiment of the present invention provides a schematic structural diagram of hardware of an unmanned aerial vehicle. As shown in FIG. 5, the unmanned aerial vehicle 10 includes:

one or more processors 401, and a memory 402, one processor 401 being used as an example in FIG. 5. The processor 401 and the memory 402 are connected through a bus or in other manners, and the processor and the memory being connected through a bus is used as an example in FIG. 5.

The memory 402, as a non-volatile computer readable storage medium, may be configured to store a non-volatile software program, a non-volatile computer-executable program and a module, such as a program instruction/unit (for example, the first control and calculation module 101, the second control and calculation module 102 and the first calculating module 103 shown in FIG. 3) corresponding to the method for improving ranging data stability of the unmanned aerial vehicle in the embodiment of the present invention. The processor 401 executes various functional applications and data processing of the unmanned aerial vehicle by running a non-volatile software program, instruction and a module stored in the memory 402, that is, implementing the foregoing method for improving ranging data stability of the unmanned aerial vehicle in the embodiment of the present invention.

The memory 402 may include a program storage area and a data storage area. The program storage area may store an operating system and an application program that is required for at least one function. The data storage area may store data and the like created according to use of the unmanned aerial vehicle. In addition, the memory 402 may include a high-speed random-access memory, and may further include a non-volatile memory, such as at least one magnetic disk memory device, a flash memory device, or other non-volatile solid-state memory devices. In some embodiments, the memory 402 may optionally include memories remotely disposed relative to the processor 401, these remote memories being connected to an unmanned aerial vehicle via a network. An example of the foregoing network includes, but is not limited to, the Internet, an intranet, a local area network, a mobile communications network and a combination thereof.

The one or more units are stored in the memory 402. When executed by the one or more processors 401, the one or more units perform the unmanned aerial vehicle ranging method in any of the foregoing method embodiments, for example, performing step S101 to step S103 in the foregoing method in FIG. 1, step S1001 to step S1004 in the foregoing method in FIG. 2, and achieving functions of the module 101 to module 103 in FIG. 3.

The foregoing alarm clock may be configured to perform the unmanned aerial vehicle ranging method provided according to the embodiments of the present invention and has corresponding functional modules for performing the method and beneficial effects thereof. For technical details not described in the embodiments of the unmanned aerial vehicle, reference may be made to the method for improving ranging data stability of the unmanned aerial vehicle provided by the embodiments of the invention.

The embodiments of the present invention provide a non-volatile computer readable storage medium storing a computer executable instruction, when the computer executable instruction is executed by one or more processors, for example, step S101 to step S103 in the method of FIG. 1 and step S1001 to step S1004 in the method of FIG. 3 being performed, functions of the modules 101-103 in FIG. 3 being achieved.

It should be noted that, the apparatus embodiment described above is merely exemplary, and the modules described as separate components may or may not be physically separate, the components displayed as units may or may not be physical units, that is, may be located in one place, or may be distributed on a plurality of network units, Part or all of the modules may be selected according to actual needs to achieve the objective of the solution of this embodiment.

Through the description of the above embodiments, a person skilled in the art can clearly understand that the embodiments can be implemented by means of software plus a general hardware platform, and certainly, can also be implemented by hardware. Based on such an understanding, the foregoing technical solution in essence or the part that contributes to the related technology can be embodied in the form of a software product, which can exist in a computer-readable storage medium, such as ROM/RAM, magnetic disk, An optical disc, and the like, including a plurality of instructions for enabling a computer device (which may be a personal computer, a server, or a network device, etc.) to perform the methods described in the embodiments or certain parts of the embodiments.

The above description is only an implementation manner of the present invention, and thus does not limit the scope of the patent of the present invention. Any equivalent structure or equivalent process transformation made by using the description and accompanying drawings of the present invention, or directly or indirectly applied to other related technologies. The same applies to the scopes of patent protection of the present invention.

What is claimed is:

1. An unmanned aerial vehicle ranging method, applied to an unmanned aerial vehicle provided with a light ray transmitting module and a light ray receiving module, wherein the method comprises:

controlling the light ray transmitting module to transmit, to a ground, a first modulated light whose frequency is a first modulation frequency, acquiring a first phase deviation between a first modulated light received by the light ray receiving module and the first modulated light transmitted by the light ray transmitting module, and calculating a first to-ground distance of the unmanned aerial vehicle according to the first phase deviation and the first modulation frequency;

controlling the light ray receiving module to transmit, to the ground, a second modulated light whose frequency is a second modulation frequency, acquiring a second phase deviation between a second modulated light received by the light ray receiving module and the second modulated light transmitted by the light ray transmitting module, and calculating a second to-ground distance of the unmanned aerial vehicle according to the second phase deviation and the second modulation frequency; and calculating a final to-ground distance of the unmanned aerial vehicle according to the first to-ground distance and the second to-ground distance;

wherein the controlling the light ray transmitting module to transmit, to a ground, a first modulated light whose frequency is a first modulation frequency comprises:

acquiring an initial to-ground distance stored in the unmanned aerial vehicle, querying a pre-stored initial measurement ramp according to the initial to-ground distance, and acquiring an initial modulation frequency corresponding to the initial to-ground distance according to the initial measurement range; and acquiring a modulation frequency lower than an initial modulation frequency, as the first modulation frequency, and controlling the light ray transmitting module to transmit, to the ground, the first modulated light whose frequency is the first modulation frequency.

2. The unmanned aerial vehicle ranging method according to claim 1, wherein the method further comprises:
pre-acquiring a plurality of modulated lights corresponding to a plurality of modulation frequencies that are changed in gradient, and calculating and storing a measurement range of the modulated lights corresponding to the plurality of modulation frequencies.

3. The unmanned aerial vehicle ranging method according to claim 1, wherein the controlling light ray receiving module to transmit, to the ground, a second modulated light whose frequency is a second modulation frequency comprises:
acquiring a modulation frequency higher than the initial modulation frequency as the second modulation frequency, and controlling the light ray transmitting module to transmit, to the ground, the second modulated light whose frequency is the second modulation frequency.

4. The unmanned aerial vehicle ranging method according to claim 1, wherein the calculating a final to-ground distance of the unmanned aerial vehicle according to the first to-ground distance and the second to-ground distance comprises:
after the first to-ground distance is acquired, dividing the first to-ground distance into an integer place and a decimal place, and acquiring an integer portion of the first to-ground distance as an integer portion of the final to-ground distance of the unmanned aerial vehicle;
after the second to-ground distance is acquired, dividing the second to-ground distance into an integer place and a decimal place, and acquiring a decimal portion of the second to-ground distance as a decimal portion of the final to-ground distance of the unmanned aerial vehicle; and
generating the final to-ground distance of the unmanned aerial vehicle according to the integer portion of the final to-ground distance and the decimal portion of the final to-ground distance.

5. The unmanned aerial vehicle ranging method according to claim 1, wherein the method further comprises:
controlling the light ray receiving module to transmit, to the ground, a third modulated light whose frequency is a third modulation frequency, acquiring a third phase deviation between a third modulated light received by the light ray receiving module and the third modulated light transmitted by the light ray transmitting module, and calculating a third to-ground distance of the unmanned aerial vehicle according to the third phase deviation and the third modulation frequency; and
calculating a final to-ground distance of the unmanned aerial vehicle according to the first to-ground distance, the second to-ground distance and the third to-ground distance.

6. The unmanned aerial vehicle ranging method according to claim 5, wherein when it is detected that the first modulation frequency is less than the second modulation frequency, and the second modulation frequency is less than the third modulation frequency, the calculating a final to-ground distance of the unmanned aerial vehicle according to the first to-ground distance, the second to-ground distance and the third to-ground distance comprises:
pre-dividing values of the first to-ground distance, the second to-ground distance and the third to-ground distance into an integer place, a tenths digit and a percentile for representation;
after the first to-ground distance is acquired, acquiring an integer portion of the first to-ground distance as an integer portion of the final to-ground distance of the unmanned aerial vehicle;
after the second to-ground distance is acquired, acquiring a tenths digit portion of the second to-ground distance as a tenths digit portion of the final to-ground distance of the unmanned aerial vehicle;
after the third to-ground distance is acquired, acquiring a percentile portion of the third to-ground distance as a percentile portion of the final to-ground distance of the unmanned aerial vehicle; and
generating the final to-ground distance of the unmanned aerial vehicle according to the integer portion of the final to-ground distance, the tenths digit portion of the final to-ground distance and the percentile portion of the final to-ground distance.

7. An unmanned aerial vehicle ranging apparatus applied to an unmanned aerial vehicle provided with a light ray transmitting module and a light ray receiving module, comprising:
a first control and calculating module configured to: control the light ray transmitting module to transmit, to a ground, a first modulated light whose frequency is a first modulation frequency, acquire a first phase deviation between a first modulated light received by the light ray receiving module and the first modulated light transmitted by the light ray transmitting module, and calculate a first to-ground distance of the unmanned aerial vehicle according to the first phase deviation and the first modulation frequency;
a second control and calculating module configured to: control the light ray receiving module to transmit, to the ground, a second modulated light whose frequency is a second modulation frequency, acquire a second phase deviation between a second modulated light received by the light ray receiving module and the second modulated light transmitted by the light ray transmitting module, and calculate a second to-ground distance of the unmanned aerial vehicle according to the second phase deviation and the second modulation frequency; and a first calculating module configured to calculate a final to-ground distance of the unmanned aerial vehicle according to the first to-ground distance and the second to-ground distance;

wherein the first control and calculating module is further configured to:

acquire an initial to-ground distance stored in the unmanned aerial vehicle, query a pre-stored initial measurement range according to the initial to-ground distance, and acquire an initial modulation frequency corresponding to the initial to-ground distance according to the initial measurement range; and acquire a modulation frequency lower than an initial modulation frequency as the first modulation frequency, and control the light ray transmitting module to transmit, to the ground, the first modulated light whose frequency is the first modulation frequency.

8. The unmanned aerial vehicle ranging apparatus according to claim 7, further comprising:

a storage module configured to: pre-acquire a plurality of modulated lights corresponding to a plurality of modulation frequencies that are changed in gradient, and calculate and store measurement ranges of the modulated lights corresponding to the plurality of modulation frequencies.

9. The unmanned aerial vehicle ranging apparatus according to claim 7, the second control and calculating module is further configured to: acquire a modulation frequency higher than the initial modulation frequency as the second modulation frequency, and control the light ray transmitting module to transmit, to the ground, the second modulated light whose frequency is the second modulation frequency.

10. The unmanned aerial vehicle ranging apparatus according to claim 7, wherein the first calculating module is further configured to:

after the first to-ground distance is acquired, divide the first to-ground distance into an integer place and a decimal place, and acquire an integer portion of the first to-ground distance as an integer portion of the final to-ground distance of the unmanned aerial vehicle;

after the second to-ground distance is acquired, divide the second to-ground distance into an integer place and a decimal place, and acquire a decimal portion of the second to-ground distance as a decimal portion of the final to-ground distance of the unmanned aerial vehicle; and generate the final to-ground distance of the unmanned aerial vehicle according to the integer portion of the final to-ground distance and the decimal portion of the final to-ground distance.

11. The unmanned aerial vehicle ranging apparatus according to claim 7, further comprising:

a third control and calculating module configured to: control the light ray receiving module to transmit, to the ground, a third modulated light whose frequency is a third modulation frequency, acquire a third phase deviation between a third modulated light received by the light ray receiving module and the third modulated light transmitted by the light ray transmitting module, and calculate a third to-ground distance of the unmanned aerial vehicle according to the third phase deviation and the third modulation frequency; and a second calculating module configured to calculate a final to-ground distance of the unmanned aerial vehicle according to the first to-ground distance, the second to-ground distance and the third to-ground distance.

12. The unmanned aerial vehicle ranging apparatus according to claim 11, when it is detected that the first modulation frequency is less than the second modulation frequency, and the second modulation frequency is less than the third modulation frequency, the second calculating module is specifically configured to:

pre-divide values of the first to-ground distance, the second to-ground distance and the third to-ground distance into an integer place, a tenths digit and a percentile for representation;

after the first to-ground distance is acquired, acquire an integer portion of the first to-ground distance as an integer portion of the final to-ground distance of the unmanned aerial vehicle;

after the second to-ground distance is acquired, acquire a tenths digit portion of the second to-ground distance as a tenths digit portion of the final to-ground distance of the unmanned aerial vehicle;

after the third to-ground distance is acquired, acquire a percentile portion of the third to-ground distance as a percentile portion of the final to-ground distance of the unmanned aerial vehicle; and generate the final to-ground distance of the unmanned aerial vehicle according to the integer portion of the final to-ground distance, the tenths digit portion of the final to-ground distance and the percentile portion of the final to-ground distance.

13. An unmanned aerial vehicle, comprising:

at least one processor; and a memory communicably connected to the at least one processor; wherein the memory stores an instruction that may be executed by the at least one processor, the instruction, when executed by the at least one processor, causing the at least one processor to:

acquire an initial to-ground distance stored in the unmanned aerial vehicle, query a pre-stored initial measurement range according to the initial to-ground distance, and acquire an initial modulation frequency corresponding to the initial to-ground distance according to the initial measurement range;

acquire a modulation frequency lower than an initial modulation frequency as the first modulation frequency, and control the light ray transmitting module to transmit, to the ground, the first modulated light whose frequency is the first modulation frequency;

acquire a first phase deviation between a first modulated light received by the light ray receiving module and the first modulated light transmitted by the light ray transmitting module, and calculating a first to-ground distance of the unmanned aerial vehicle according to the first phase deviation and the first modulation frequency;

control the light ray receiving module to transmit, to the ground, a second modulated light whose frequency is a second modulation frequency, acquiring a second phase deviation between a second modulated light received by the light ray receiving module and the second modulated light transmitted by the light ray transmitting module, and calculating a second to-ground distance of the unmanned aerial vehicle according to the second phase deviation and the second modulation frequency; and calculate a final to-ground distance of the unmanned aerial vehicle according to the first to-ground distance and the second to-ground distance.

14. A non-volatile computer readable storage medium storing a computer executable instruction, the computer executable instruction, when executed by one or more processors, causing the one or more processors to:

acquire an initial to-ground distance stored in the unmanned aerial vehicle, query a pre-stored initial measurement range according to the initial to-ground distance, and acquire an initial modulation frequency corresponding to the initial to-ground distance according to the initial measurement range;

acquire a modulation frequency lower than an initial modulation frequency as the first modulation frequency, and control the light ray transmitting module to transmit, to the ground, the first modulated light whose frequency is the first modulation frequency;

acquire a first phase deviation between a first modulated light received by the light ray receiving module and the first modulated light transmitted by the light ray transmitting module, and calculating a first to-ground distance of the unmanned aerial vehicle according to the first phase deviation and the first modulation frequency;

control the light ray receiving module to transmit, to the ground, a second modulated light whose frequency is a second modulation frequency, acquiring a second phase deviation between a second modulated light received by the light ray receiving module and the second modulated light transmitted by the light ray transmitting module, and calculating a second to-ground distance of the unmanned aerial vehicle according to the second phase deviation and the second modulation frequency; and calculate a final to-ground distance of the unmanned aerial vehicle according to the first to-ground distance and the second to-ground distance.

\* \* \* \* \*